H. A. WILLIAMS & T. H. BROWN.
Trotting-Sulky.
No. 222,558. Patented Dec. 9, 1879.
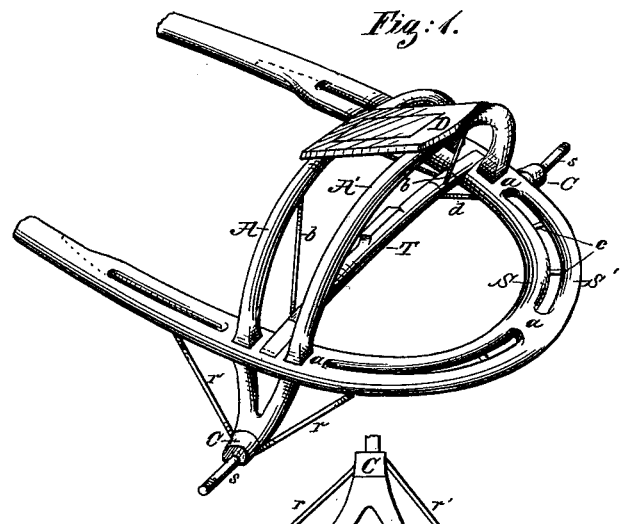
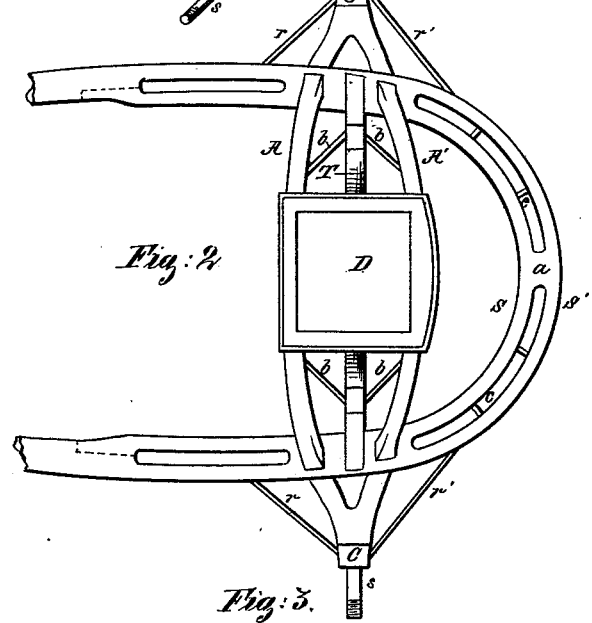
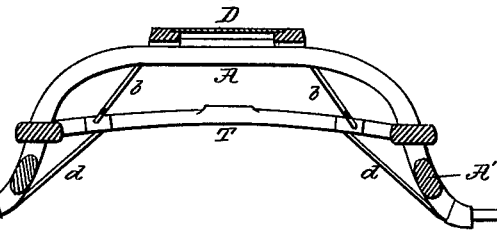

UNITED STATES PATENT OFFICE.

HOMER A. WILLIAMS AND THOMAS H. BROWN, OF CHICAGO, ILLINOIS.

IMPROVEMENT IN TROTTING-SULKIES.

Specification forming part of Letters Patent No. 222,558, dated December 9, 1879; application filed July 21, 1879.

*To all whom it may concern:*

Be it known that we, HOMER A. WILLIAMS and THOMAS H. BROWN, of Chicago, in the county of Cook and State of Illinois, have jointly invented certain new and useful Improvements in Trotting-Sulkies; and we do hereby declare that the following is a full, clear, and exact description thereof, reference being had to the accompanying drawings, and to the letters of reference marked thereon, which form a part of this specification.

The constant difficulty met with in the effort to reduce the weight of sulkies for fast trotting is to make the frame, while light, sufficiently rigid. It is desirable that the wheel-spindles shall maintain their original direction, in order that the draft may not be increased by "buckling" or by spread of the wheels. In other words, it is desirable that the axle shall not spring vertically under the weight of the driver, that it shall not spring backward under resistance of the ground, and that it shall not spring forward in tightening the shafts properly upon the horse. These difficulties are considerably enhanced in the use of an axle arched centrally above the plane of the shafts; but this construction of the axle is, for so many reasons, preferable that we have sought in the novel provisions herein presented to secure proper rigidity in connection with that form of the axle, and to preserve due and requisite lightness also.

To effect these purposes we have made a new distribution of the wood material of the frame, dividing and disposing the same so that it will be broadly spread in the several planes of strain, on the general principle of the truss, appropriate bracing being employed to unify the separated parts and impart the necessary rigidity.

In an application for patent allowed to one of the present applicants, June 18, 1879, this general principle was applied to the arched axle in its vertical direction by introducing the chord, (herein marked T) and to the shaft plane by a novel system of bracing.

In the present application the principle is applied in another manner to the shaft plane, is more extendedly and perfectly applied to the vertical plane of strain upon the axle by means of added braces, and is directly, and for the first time in any manner, applied to the axle itself, in the horizontal plane of strain upon it, by a division and distribution of the material of the axle.

Thus, to refer to the drawings, the axle is formed of two parts, A and A', which, in their central portion, lie at any desired distance apart, and nearly in a horizontal line when the sulky is in use. These parts unite near the wheels, and are there securely clamped together by the clips C, which also secure the spindles $s$ to the axle.

The double axle is high-arched, and the connection between the two separated parts thereof necessary to secure the greatest possible rigidity as against horizontal strain is obtained by joining them in their abruptly rising portions with the shafts, and in their central elevated portions by the side rails of the seat D. Added strength in the same direction may be obtained by the ordinary wheel-braces $r$ $r'$. Other portions being properly made, suitable rigidity of the axle, as against forward and backward strain of the axle, is obviously obtained by the construction above described, whether the axle be arched much or little, or not at all.

The high-arched axle, reaching above the plane of the shafts, is a recognized advantage in a sulky; but in its use there is obviously developed a necessity for guarding against spreading of the wheels under the weight of the driver. For this purpose the chord T, connecting the opposite rising portions of the arch, is supplemented by the braces $d$ and $b$, which combine with the axle and chord to form a crescent-shaped or arched vertical truss of great strength, to the extremities of which the spindles $s$ are secured. In the case of a divided axle, (herein shown,) the braces $b$ are duplicated, one running to each part of the axle, as seen in Fig. 2.

Additional rigidity in the horizontal plane of strain is obtained by making the rear extensions of the shafts to consist of the parts S S', which lie at any desired distance apart in the same plane, and are connected by the braces or connections $a$ $a$ $c$ $c$. These parts are shown parallel; but they may form the outline of a crescent, if desired.

We have thus, in the sulky-frame, described a vertical and a horizontal truss arranged to intersect each other, and having the common chord T and an additional independent truss formed of the divided axle. These trusses combine to meet strain in every possible direction, and to secure permanent and proper relation to the wheels under all circumstances.

The intersection of the parts S and S' of the shafts may be located at such points in advance of the axle as to serve as foot-rests, if desired, thus dispensing with the additional iron rests, and securing the advantage of wider space between the shafts at this point.

Having thus described our invention, we claim—

1. In combination with the axle arched above the plane of the shafts, and the chord T, the braces $d\ b$, connecting the chord with the arch, and also with the extremities of the axle, substantially as and for the purpose specified.

2. The duplex curved rear extension of the shafts, formed of the parts S and S', stiffened by suitable connecting-braces $a\ c$, substantially as and for the purpose set forth.

3. In a sulky, the duplex axle composed of the separated parts A and A', which meet near the wheels, and are suitably connected in their separated portion to give them rigidity, substantially as described.

4. In combination with the arched duplex axle A A', the seat D, resting upon said axle, and by its connection therewith forming a brace uniting the two parts A and A', substantially as described.

In testimony that we claim the foregoing as our joint invention we affix our signatures in presence of two witnesses.

HOMER A. WILLIAMS.
THOMAS H. BROWN.

Witnesses:
M. E. DAYTON,
JESSE COX, Jr.